US007400493B2

(12) United States Patent
Ewing et al.

(10) Patent No.: US 7,400,493 B2
(45) Date of Patent: Jul. 15, 2008

(54) CIRCUIT BREAKING LINK STATUS DETECTION AND REPORTING CIRCUIT

(75) Inventors: Brandon W. Ewing, Reno, NV (US); Andrew J. Cleveland, Reno, NV (US); James P. Maskaly, Sparks, NV (US); Dennis W. McGlumphy, Sun Valley, NV (US); Brian P. Auclair, Reno, NV (US)

(73) Assignee: Server Technology, Inc., Reno, NV (US)

( * ) Notice: Subject to any disclaimer, the term of this patent is extended or adjusted under 35 U.S.C. 154(b) by 282 days.

(21) Appl. No.: 11/059,001

(22) Filed: Feb. 15, 2005

(65) Prior Publication Data

US 2006/0092600 A1 May 4, 2006

Related U.S. Application Data

(60) Provisional application No. 60/624,286, filed on Nov. 1, 2004.

(51) Int. Cl.
*H02B 1/26* (2006.01)
*H01R 13/46* (2006.01)

(52) U.S. Cl. ....................... 361/623; 361/626; 361/642; 361/621; 337/186; 337/189; 174/59; 174/520; 307/43; 307/86; 307/87

(58) Field of Classification Search ................. 361/621, 361/623, 626, 642; 337/186, 189; 174/59, 174/520; 307/43, 86, 87
See application file for complete search history.

(56) References Cited

U.S. PATENT DOCUMENTS 4,539,487 A * 9/1985 Ishii ............................ 307/44
4,840,568 A 6/1989 Burroughs et al.
5,506,573 A 4/1996 Ewing et al.
5,680,294 A 10/1997 Stora et al.
5,705,862 A * 1/1998 Lutz et al. .................. 307/147
5,821,636 A 10/1998 Baker et al.
5,949,947 A 9/1999 Eslambolchi et al.
6,157,527 A * 12/2000 Spencer et al. ................ 361/64
6,212,049 B1 * 4/2001 Spencer et al. ................ 361/64
6,220,880 B1 4/2001 Lee et al.
6,380,862 B1 4/2002 Karim et al.
6,443,746 B1 9/2002 Yu
6,608,406 B2 8/2003 Bersiek
6,626,705 B2 9/2003 Perrone et al.
6,630,751 B2 10/2003 Curtis et al.

(Continued)

*Primary Examiner*—Anatoly Vortman
(74) *Attorney, Agent, or Firm*—Holland & Hart, LLP

(57) ABSTRACT

Certain embodiments provide a circuit breaking link status and reporting system. The system includes a power source and a circuit breaking link in communication therewith. An electrical outlet is in interruptible power supply communication with the circuit breaking link. A sensor is in interruptible electrical communication with the circuit breaking link and configured to generate a signal indicating whether the circuit breaking link is open. A local processor communicates with the sensor and is configured to determine whether the circuit is open. A communications bus is in communication with the local processor and configured to receive signals from the local processor. A processor is in communication with the local processor through the communications bus and configured to receive information regarding the status of the circuit breaking link. A communications port is in communication with the processor and configured to send information regarding the status of the circuit breaking link over a network.

21 Claims, 9 Drawing Sheets

U.S. PATENT DOCUMENTS 6,667,681 B1 12/2003 Meiners et al.
6,711,613 B1 3/2004 Ewing et al.
6,803,678 B2 10/2004 Gottlieb et al.
6,826,036 B2 11/2004 Pereira
6,826,038 B2 11/2004 Chen
6,827,582 B2 12/2004 Morris et al.
6,882,530 B2 4/2005 Cyphers et al.
6,897,379 B1 5/2005 Hsiao
6,940,730 B1 9/2005 Berg, Jr. et al.
6,967,283 B2 11/2005 Rasmussen et al.
6,972,688 B2 * 12/2005 Rapaich .................. 340/693.1
7,116,550 B2 10/2006 Ewing et al.
7,141,891 B2 11/2006 McNally et al.
7,196,900 B2 3/2007 Ewing et al.
2002/0052940 A1 5/2002 Myers et al.
2003/0085624 A1 * 5/2003 Kadoi et al. .................. 307/64
2003/0126253 A1 7/2003 Ewing et al.
2005/0057870 A1 * 3/2005 Stellato et al. ................ 361/66
2005/0094357 A1 5/2005 Ewing et al.
2005/0101193 A1 5/2005 Godard
2005/0259383 A1 11/2005 Ewing et al.
2006/0139855 A1 6/2006 Ewing et al.

* cited by examiner

CIRCUIT BREAKING LINK STATUS DETECTION AND REPORTING CIRCUIT

CROSS REFERENCE TO RELATED APPLICATIONS

The present application claims, the benefit of, and hereby expressly incorporates by reference in its entirety, U.S. Provisional Patent Application No. 60/624,286, filed Nov. 1, 2004, and entitled "POWER DISTRIBUTION APPARATUS", By Ewing et al.

TECHNICAL FIELD

The present invention relates to methods and systems for reporting the status of a circuit breaking link. Certain embodiments provide power distribution apparatus utilizing a circuit breaking link connector and which reports the status of the circuit breaking link connector.

BACKGROUND

Electronic equipment racks commonly consist of rectangular or box-shaped housings or rack structures. Electronic equipment is commonly mountable in such racks so that the various electronic components are aligned vertically one on top of the other in the rack. Often, multiple racks are oriented side-by-side, with each rack containing numerous electronic components and having substantial quantities of associated component wiring located both within and outside of the area occupied by the racks.

Power distribution units have long been utilized to supply power to the equipment in such racks. Power distribution units have also been designed to allow a user to remotely monitor and control the power distribution unit or devices attached to the power distribution unit. Examples of such power distribution units can be found in U.S. Pat. Nos. 5,506,573, 5,949,947, and 6,711,613.

One particularly common such power distribution unit consists of an elongated box housing that has one or more power inputs penetrating the housing and a number of power outputs extending along the longitudinal face of the unit. This power distribution unit is designed to mount vertically adjacent or secured to the external rear side of a rack. In this fashion, the power supplied to the unit is then distributed through horizontally extending power outputs to the, typically, horizontally co-aligned electronic components mounted in the rack. An example of such a prior power distribution unit is sold under the trademark POWER TOWER by Server Technology, Inc., of Reno, Nev.

As previously stated, each power distribution unit typically contains a number of power outputs and at least one power input. The power distribution units may also contain other electronic components, such as fuses and monitoring devices.

Some prior art power distribution units are protected by fuses or other devices to protect the power distribution unit and attached electronic devices against current fluctuations. Often, the fuses may only be checked and replaced by removing the power distribution unit from a rack and opening the power distribution unit. In addition to possibly being time consuming and labor intensive, opening up the unit may violate a warranty on the unit.

Typically, each power distribution unit must be visually inspected in order to determine if a circuit breaking link has opened a circuit. As the number of circuit breaking links increases, it may be more time consuming and difficult to identify the circuit breaking link responsible for the open circuit. Additionally, a remote user may not be aware that a circuit has opened and the electrical devices are no longer receiving power from the power distribution unit.

Despite the inconveniences that may be associated with fuses, many standards setting organizations, certifying bodies, and codes are requiring branched circuit protection. That is, power outlets may be arranged in groups or "branches," each of which must be separately fused. Branched circuit protection may result in an increased number of fuses in each power distribution unit.

BRIEF SUMMARY OF ASPECTS OF THE INVENTION

The present invention provides circuit breaking link status detection and reporting circuitry. Certain embodiments provide a power distribution unit constructed using a circuit breaking link status detection and reporting circuit.

In one embodiment of the circuit breaking link status detection and reporting circuit, a power source, such as an AC power source, provides input to the circuit. The power is connected to a circuit breaking link, such as a circuit breaker or a fuse. An output side of the circuit breaking link is in communication with a power output. The output side of the circuit breaking link is also in communication with a sensor. The sensor detects whether electricity is flowing through the circuit breaking link. The sensor is in communication with a system controller configured to relay the status of the circuit breaking link to a user.

In certain embodiments, the sensor includes a voltage sensor. The voltage sensor may be an optoisolator.

In some embodiments, the circuit breaking link status detection and reporting circuit includes a fuse state indicator in communication with the output side of the circuit breaking link. The fuse state indicator may be an LED that is illuminated when the circuit is closed. A resistor may be located intermediate the circuit breaking link and the fuse state indicator. In a particular implementation, the sensor and the circuit output are connected in parallel with the output side of the circuit breaking link.

In further embodiments, a resistor is located intermediate the sensor and the system controller.

In yet further embodiments, the sensor is in communication with a communications bus. The communications bus is in communication with the system controller. In at least one implementation, the communications bus is an I2C bus.

In certain embodiments, the sensor is in communication with a local controller. The local controller is in communication with the system controller. In at least one implementation, the local controller and the system controller interface through a communications bus, such as an I2C bus.

In certain embodiments, the circuit breaking link status detection and reporting circuit includes an input from a second AC power source. The input from the second AC power source is connected to a second circuit breaking link. An output end of the second circuit breaking link is in communication with the circuit output.

In a particular implementation, the first and second AC power sources are different phases of polyphase AC line power. In another implementation, the output end of the second circuit breaking link is in communication with the sensor. A yet further implementation includes an input from a third AC power source. The input from the third AC power source is connected to a third circuit breaking link. An output end of the third circuit breaking link is in communication with the circuit output. In one example, the output end of the third circuit breaking link is in communication with the sensor.

Certain embodiments include a plurality of the circuit breaking link status detection and reporting circuits according to any embodiment, including any of the previously described embodiments. In at least one implementation, each circuit output of each of the circuit breaking link status detection and reporting circuits is coupled to a branch of one or more electrical outlets.

Certain embodiments provide a method of using one or more circuit breaking link status detection and reporting circuits. The circuit breaking link status detection and reporting circuit receives power from a power input and outputs power to at least one power outlet. If the circuit breaking link status detecting and reporting circuit is opened, such as by the circuit breaking link (i.e. a blown fuse or a tripped circuit breaker), the sensor will sense a loss of power, such as by sensing a voltage or current drop, and report the loss to the system controller.

In some embodiments, the system controller tags all outlets associated with the open circuit breaking link status detection and reporting circuit. In a further embodiment, the system controller generates a notification to a user that the circuit breaking link status detection and reporting circuit is open.

In certain embodiments, a circuit breaking link status and detection circuit is formed on a circuit breaking link interconnection board that includes at least one circuit breaking link. A plurality of contacts are located on the circuit breaking link interconnection board. A first portion of the plurality of contacts may place the circuit breaking link interconnection board in communication with at least a first electrical component.

In certain implementations, a second portion of the plurality of contacts may place the circuit breaking link interconnection board in communication with at least a second electronic component. In the case of an electrical abnormality, such as a current spike, the circuit breaking link interconnection board will open a circuit, interrupting communication with the first or second electronic components.

In certain embodiments, the circuit breaking link interconnection board is a printed circuit board having a plurality of layers. One or more layers of the printed circuit board may transmit a particular electrical component. For example, in AC line power transmission, one layer of the printed circuit board may correspond to an AC line connection and another layer may correspond to an AC neutral connection. Other layers of the printed circuit board could be used for a ground connection or to transmit other electrical signals, including communication signals.

Using an entire layer of a circuit board to transmit an electrical component may allow a larger amount of the electrical component, such as a component of AC line power, to be transmitted using the circuit board. The relatively large transmission capacity of the layers of the circuit board may allow the circuit board to function as an assembly of wires.

In at least one implementation, the circuit breaking link interconnection board includes at least one layer formed in a plurality of sublayers. An insulating barrier may separate each sublayer. Accordingly, each sublayer may be used to transmit a different electrical component, such as a component of AC line power or data. The use of a circuit breaking link interconnection board having a layer formed in a plurality of sublayers may allow the circuit breaking link interconnection board to have fewer layers, to transmit more electrical components, and/or be attached to a greater number of electrical parts. The size of the sublayer is preferably sufficiently large to allow effective transmission of the particular electric component.

It is to be understood that this Summary of the Invention lists various aspects of various embodiments of the present invention. Additional aspects of the present invention will become apparent as this specification proceeds.

It is also to be understood that all features noted above need not be included in a given embodiment and that not all deficiencies noted in the prior art need be overcome by a given embodiment in order for it to fall within the scope of the present invention.

BRIEF DESCRIPTION OF THE DRAWINGS

The preferred embodiments are shown in the accompanying drawings in which.

DETAILED DESCRIPTION OF THE PREFERRED EMBODIMENTS

Figure 1:
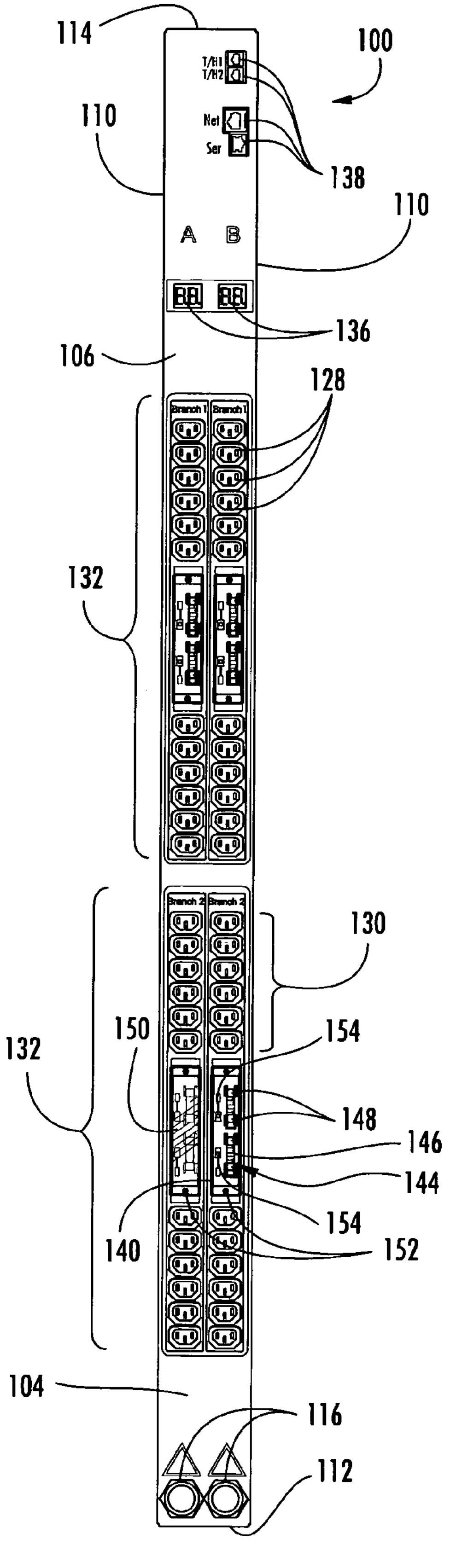
FIG. 1 is a front elevational view of a power distribution apparatus of an embodiment of the present invention having a circuit breaking link interconnection board.

A power distribution apparatus (PDA) 100 according to an embodiment of the present invention is shown in FIG. 1. The PDA 100 may be mounted to a rack (not shown). The PDA 100 has a housing 104. The housing 104 may be of any suitable dimensions. The housing 104 is preferably sized for mounting to a rack. The housing 104 is shown as a rectangular box having longitudinally extending front 106 and back 108 (FIG. 3) faces, two longitudinally extending lateral sides 110, a first end 112, and a second end 114. Of course, shapes other than rectangular boxes could be used.

The housing 104 is made of a substantially rigid and durable material, such as metals or plastics, including polycarbonate resins. In at least one embodiment, the housing 104 is made of sheet metal.

Two power inputs 116 are coupled to the housing 104. Although two power inputs 116 are shown, more or less power inputs 116 could be used. In the illustrated embodiment, the power inputs 116 are connected through the front face 106 of the housing 104, proximate the first end 112 of the housing 104. The power inputs 116 may be connected to a power supply (not shown), such as an AC line power supply, to provide a desired level of power to one or more electrical appliances (not shown). The power inputs 116 may be adapted to employ single phase power or polyphase power, such as double or triple-phase power. In embodiments employing multiphase power, multiphase power may be provided to attached electrical devices. In other embodiments, the phases are resolved and a single phase is delivered to attached electrical devices.

The housing 104 may have one or more outlet apertures 124 (FIGS. 4 and 5) through which a plurality of power outlets 128 extend. The apertures 124 are rectangular openings in the front face 106 of the housing 104. One or more power outlets 128 may represent a discrete power unit, or "branch" 132. Each branch 132 may be independently supplied with power, provided with circuit protection (such as a fuse), monitored, controlled, or wired.

In certain embodiments, including the embodiment of FIG. 1, the power outlets 128 are part of a ganged power outlet 130. A ganged power outlet 130 is a module having a plurality of electrical outlets 128. The ganged power outlets 130 may be integral components. The ganged outlets 130 are type 0909 ganged outlets available from Shurter, Inc., of Santa Rosa, Calif. Other types of ganged outlets may be used, including those disclosed in U.S. Provisional Patent Application No. 60/624,286, filed Feb. 15, 2005 and entitled "GANGED OUTLET APPARATUS," by Andrew J. Cleveland, which is hereby expressly incorporated by reference in its entirety.

The ganged outlets 130 are shown as generally linear arrangements of outlets 128, which may be arranged in columns or rows. Each branch 132 may include one or more ganged outlets 130 and/or outlets 128. As shown, two ganged outlets 130 are placed side-by-side, providing two columns of outlets 128 longitudinally extending down the front face 106 of the PDA 100.

The ganged outlets 130 may be configured to deliver the same or different amounts and types of power to their corresponding power outlets 128 and their associated electronic components. For example, one ganged outlet 130 may provide 120V, 20 A power while another ganged outlet 130 may provide 240V, 50 A power. Other ganged outlets 130 may operate at 208V. In addition, the ganged outlets 130 may have varying numbers of power outlets 128. The ganged outlets 130 may be used exclusively in the PDA 100 or in conjunction with individual outlets 128 (which may be configured to operate at any suitable voltage/current).

With continued reference to FIG. 1, a plurality of displays 136 are provided on the housing 104. As shown in FIG. 1, two displays 136 are viewable on the front face 106, proximate the second end 114, of the housing 104. The displays 136 are shown as LED displays, but may be of any suitable type, such as LCD displays.

The displays 136 provide users with information on the status of the PDA 100. Such information may include the total current drawn by one or more of the outlet gangs 130, the outlets 128, branches 132, or combinations thereof. In the embodiment of FIG. 1, each display 136 may indicate the current drawn by one of the two branches 132 or the power supplied by an input 116. In certain embodiments, one or more displays 136 indicate whether a circuit is closed or open, such as when a fuse has blown. In additional embodiments, the displays 136 display other information, such as the ambient temperature or humidity.

The PDA 100 is provided with communication connections 138. The communication connections 138 are used to send information from, or provide information to, the PDA 100. For example, the communication connections 138 may be used to provide information over a network, such as the Internet, regarding the PDA 100 to a remote user. In other embodiments, the communication connection 138 may be used by service technicians to troubleshoot, program, or obtain data from the PDA 100. In additional embodiments, sensors, such as temperature and/or humidity sensors, may be attached to the communication connections 138. The communication connections 138 may be configured to accept any desired type of communication means, such as USB connections, Ethernet connections, parallel port connections, serial connections, RS232 connections, etc.

A plurality of access openings 140 are formed in the front face 106 of the housing 104. The rectangular access openings 140 are shown longitudinally disposed at regular intervals on the front face 106 of the housing 104. The access openings 140 allow convenient access to certain components of the PDA 100.

For example, a fuse assembly 144 is accessible through each access opening 140. A fuse 146 may be removed from, or installed into, the fuse assembly 144. Each fuse assembly 144 includes two pairs of clamp arms 148, each pair of clamp arms 148 securing the removable fuse 146 and placing the fuse 146 in electrical communication with a circuit of the PDA 100. Other interrupting devices (circuit breaking links), such as circuit breakers, for example, may be utilized rather than the fuses 146.

The access openings 140 are covered by removable protective coverings, such as plastic or glass windows 150 which are secured to the housing 104 by fasteners 152. In at least one embodiment, the windows 150 are made from Lucite. The fasteners 152 are shown as screws, but other fasteners may be used, including bolts and pins. The fuses 146 may thereby be observed and replaced as desired without removing the PDA 100 from the rack and without significantly disassembling the PDA 100.

A fuse state indicator 154 is provided to indicate the status of a fuse 146. The fuse state indicator 154 may be part of the fuse 146 or separate. For example, a fuse 146 may be provided that changes appearance when it has blown. In other embodiments, such as that illustrated in FIG. 1, a separate fuse state indicator 154 is provided which is visible to a user. The separate fuse state indicator 154 may be an illumination device, such as an LED, in communication with the fuse 146, and which changes state if the fuse 146 blows. In one embodiment, the fuse state indicator 154 is an LED that is normally illuminated. When a fuse 146 blows, the LED 154 is turned off, providing a visual cue that the fuse 146 has blown.

Figure 2:
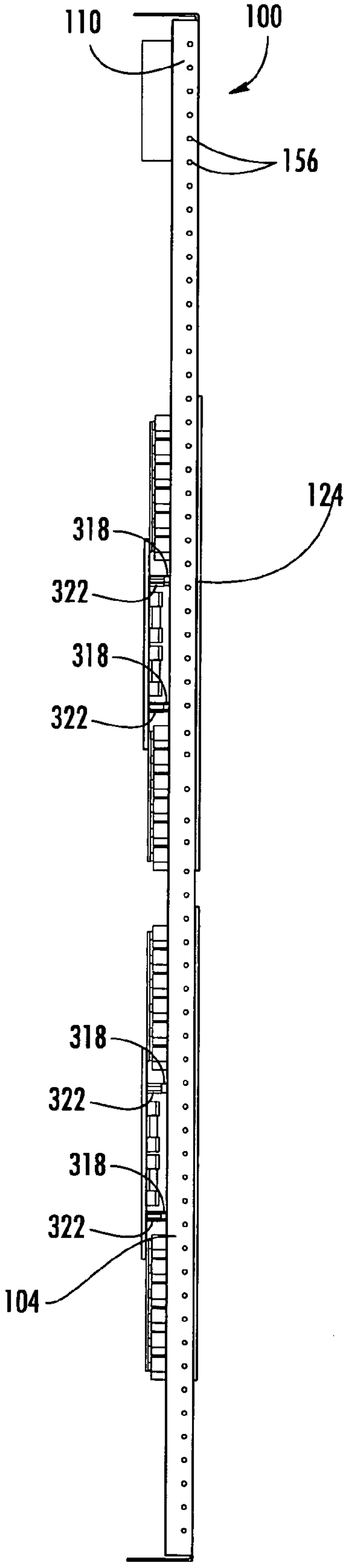
FIG. 2 is an elevational view of a lateral side of the power distribution apparatus of FIG. 1.

With reference now to FIG. 2, the PDA 100 has a plurality of strain relief mounts 156 spaced longitudinally along a longitudinal side 110 of the housing 104. Stain relief devices (not shown), such as wire bails, may be attached to the strain relief mounts 156. The strain relief devices are configured to abut power cords of devices attached to the outlets 128 of the PDA 100. The strain relief devices serve to organize such power cords, as well as secure them in position.

Figure 5:
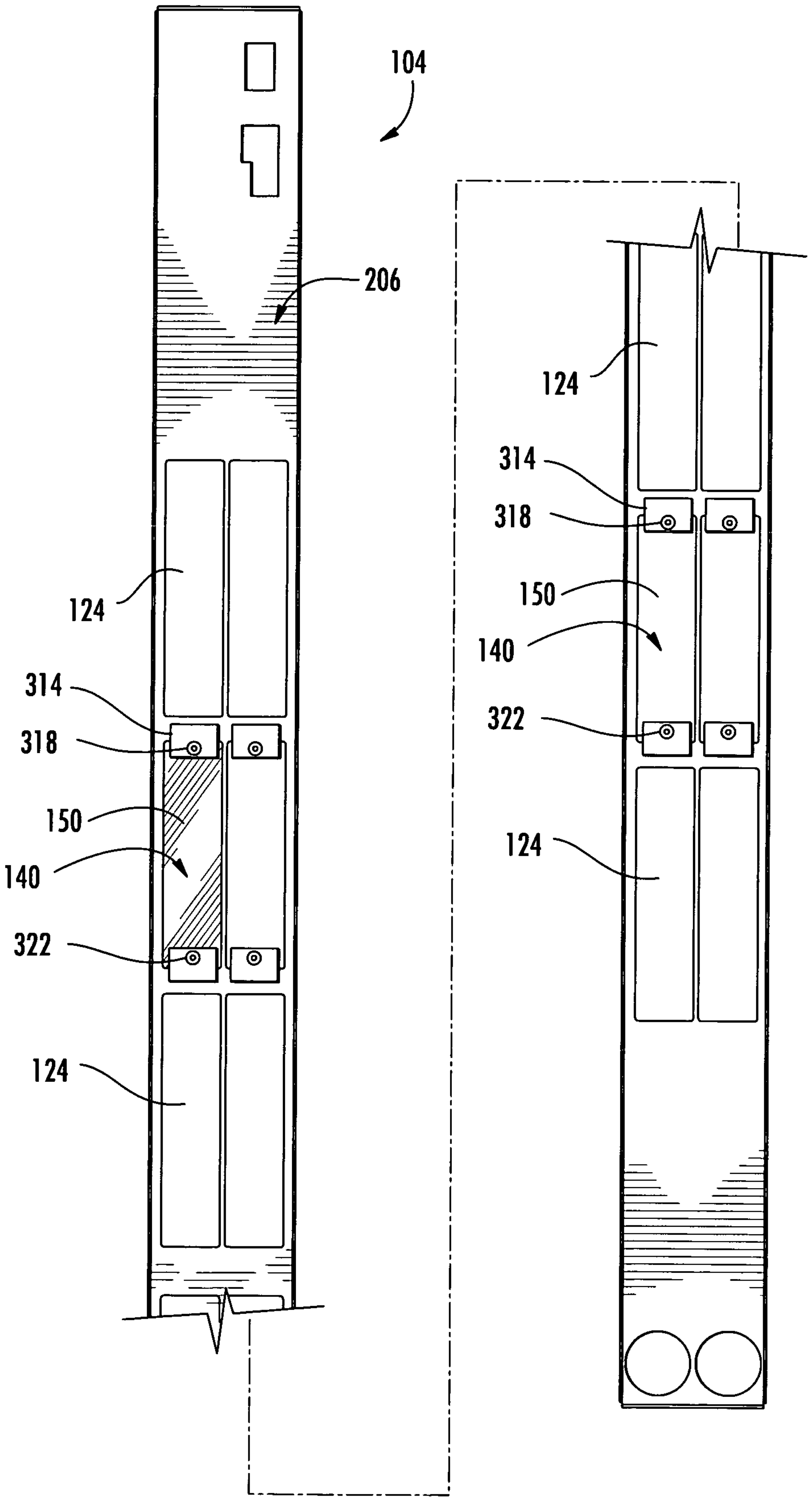
FIG. 5 is an elevational view of the inside of the top housing portion of a power distribution apparatus of the present invention.

Each fuse assembly 144 is mounted to the housing 104 by a fastener (not shown) which extends into a standoff mount 322 coupled to a cylindrical protrusion 318 on the housing 104 (also see FIG. 5).

Figure 3:
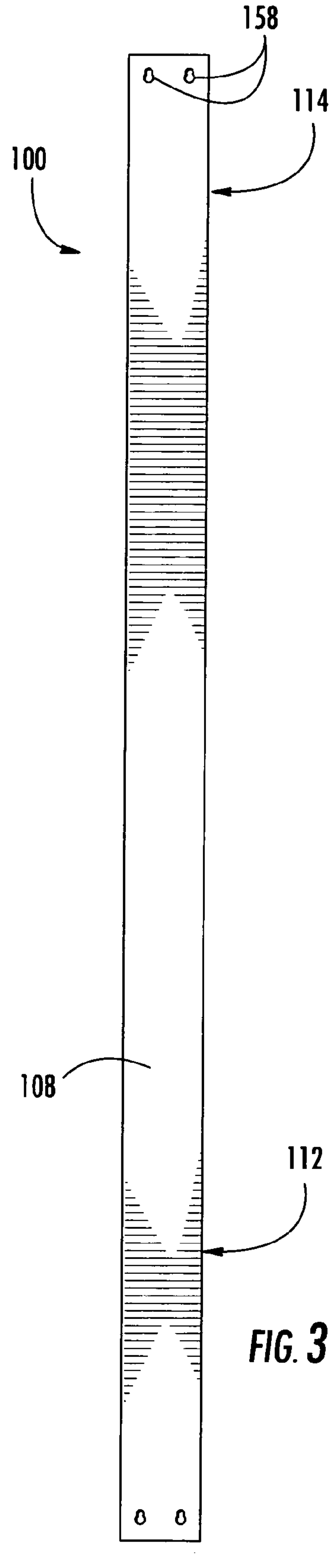
FIG. 3 is an elevational view of the back of the power distribution apparatus of FIG. 1.

As shown in FIG. 3, the housing 104 has a plurality of fastener openings 158 located at the ends 112, 114 of the housing 104. The fastener openings 158 may be used in conjunction with a fastener (not shown), such as a nail, a bolt, a screw, a pin, etc., to secure the PDA 100 to a rack. The fastener openings 158 may be threaded for receiving a bolt or screw (not shown) which is received by a corresponding opening in the rack. The number, spacing, and location of the fastener openings 158 may be varied as desired in order to enable the PDA 100 to be mounted to various types of racks. In addition, the fastener openings 158 may be provided to additional or alternate sides, faces, or ends of the housing 104 as needed.

Alternatively, the housing 104 may be provided with mounting brackets (not shown) at the first 112 and/or second 114 ends of the PDA 100. The mounting brackets may allow the PDA 100 to be mounted in a larger number of configurations. For example, racks are made by a variety of manufacturers and may differ in size and construction. The mounting adapters may allow the PDA 100 to be used with a variety of rack types. For example, racks made by American Power Conversion, Inc., of West Kingston, R.I., may be configured with mounting apertures that receive mounting pegs located on a device. Accordingly, in certain embodiments, the PDA 100 may be provided with mounting pegs (not shown), which may be received by mounting apertures (not shown) in a rack, to help secure the PDA 100 to the rack. Additional mounting adapters, which may be located at the top 114 and/or bottom 112 ends of the PDA 100, may further secure the PDA 100 to the rack.

Figure 4:
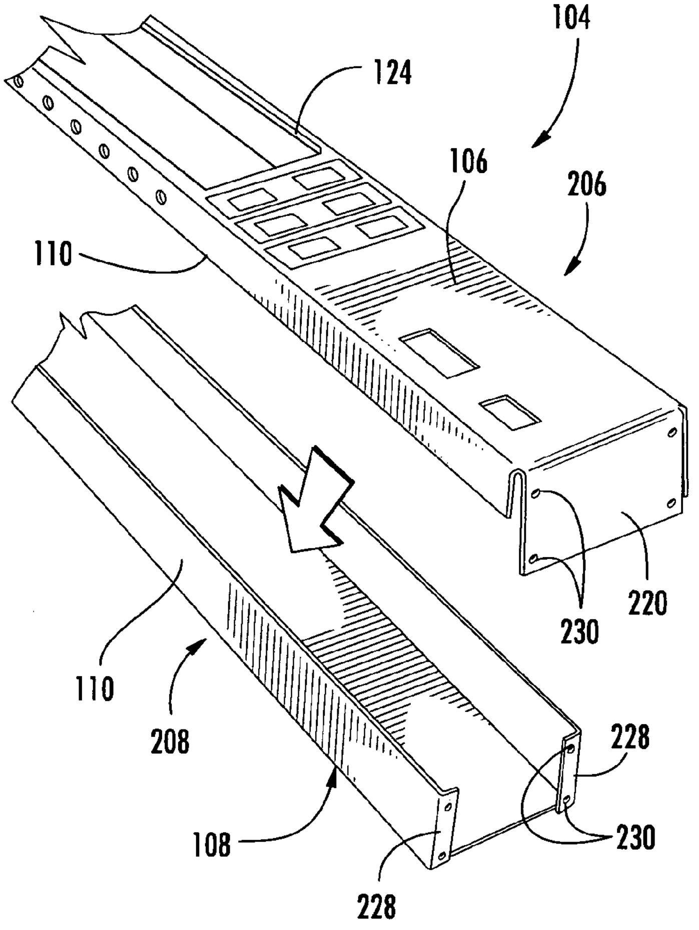
FIG. 4 is a perspective view of top and bottom sections of the housing of the power distribution apparatus of FIG. 1, illustrating how top and bottom portions of the housing may fit together.

Turning now to FIG. 4, an embodiment of a housing 104 for the PDA 100 is shown. In the embodiment of FIG. 4, the housing 104 is composed of two substantially U-shaped portions 206, 208. The upper U-shaped portion 206 forms the front face 106 and partially forms the lateral sides 110 of the housing 104. The lower U-shaped portion 208 forms the back face 108 and partially forms the lateral sides 110 of the housing 104.

The lower U-shaped portion 208 and the upper U-shaped portion 206 may be coupled by any suitable means. In the embodiment of FIG. 4, the lower U-shaped portion 208 slides over and matingly engages the upper U-shaped portion 206. The ends of the upper U-shaped portion 206 include a flap 220. The ends of the lower U-shaped portion 208 have flanges 228 that matingly engage the outer portion of the flaps 220. The upper U-shaped portion 206 and the lower U-shaped portion 208 are secured together by inserting fasteners (not shown) through fastener openings 230 in the ends of the upper U-shaped portion 206 and the ends of the lower U-shaped portion 208. The fastener openings 230 may be threaded for receiving matingly threaded fasteners.

Figure 6:
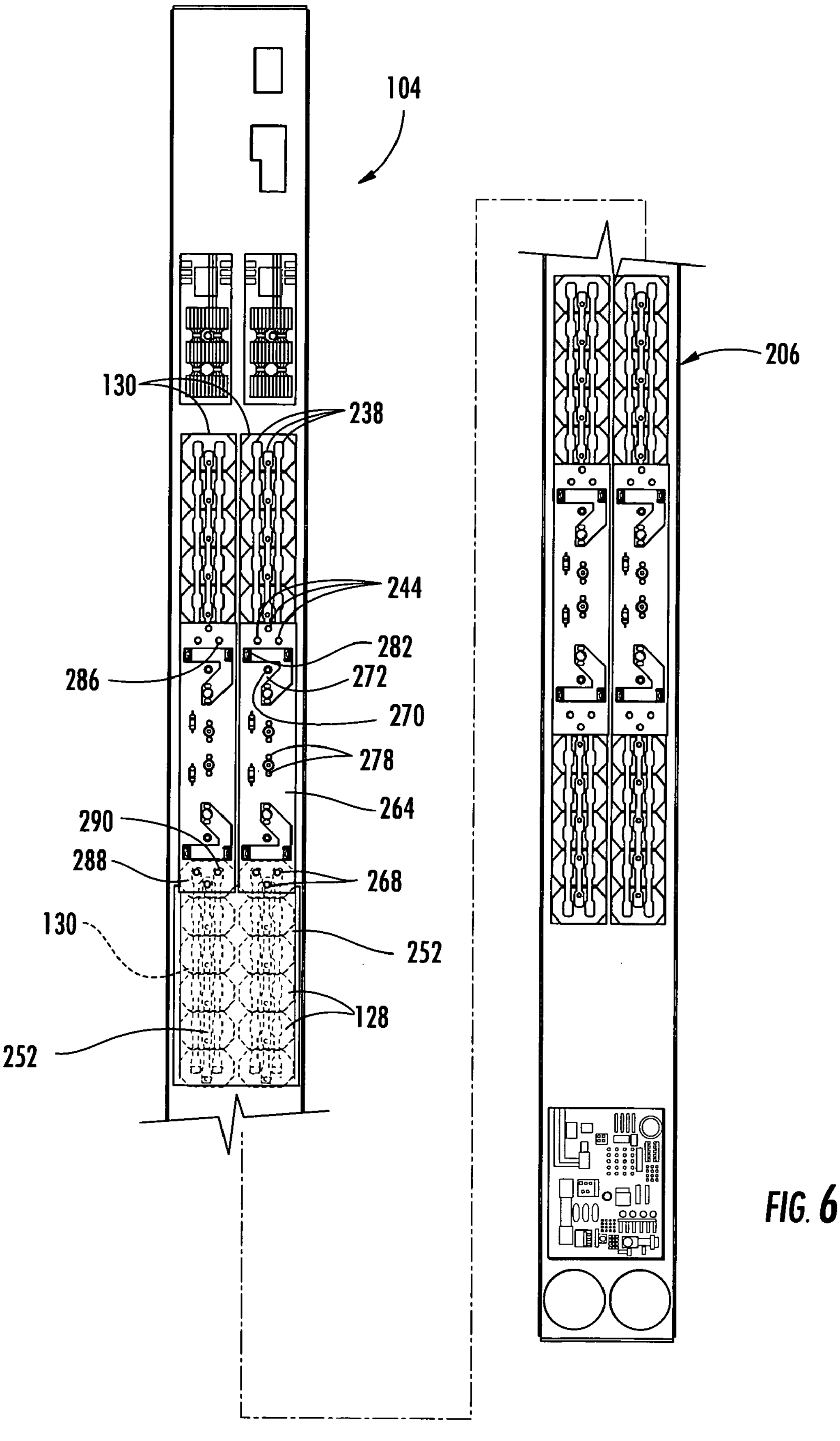
FIG. 6 is an elevational view of the inside of the top housing portion of the power distribution apparatus of FIG. 5 illustrating the placement of outlet gangs and other electronic components within the power distribution apparatus.
Figure 7:
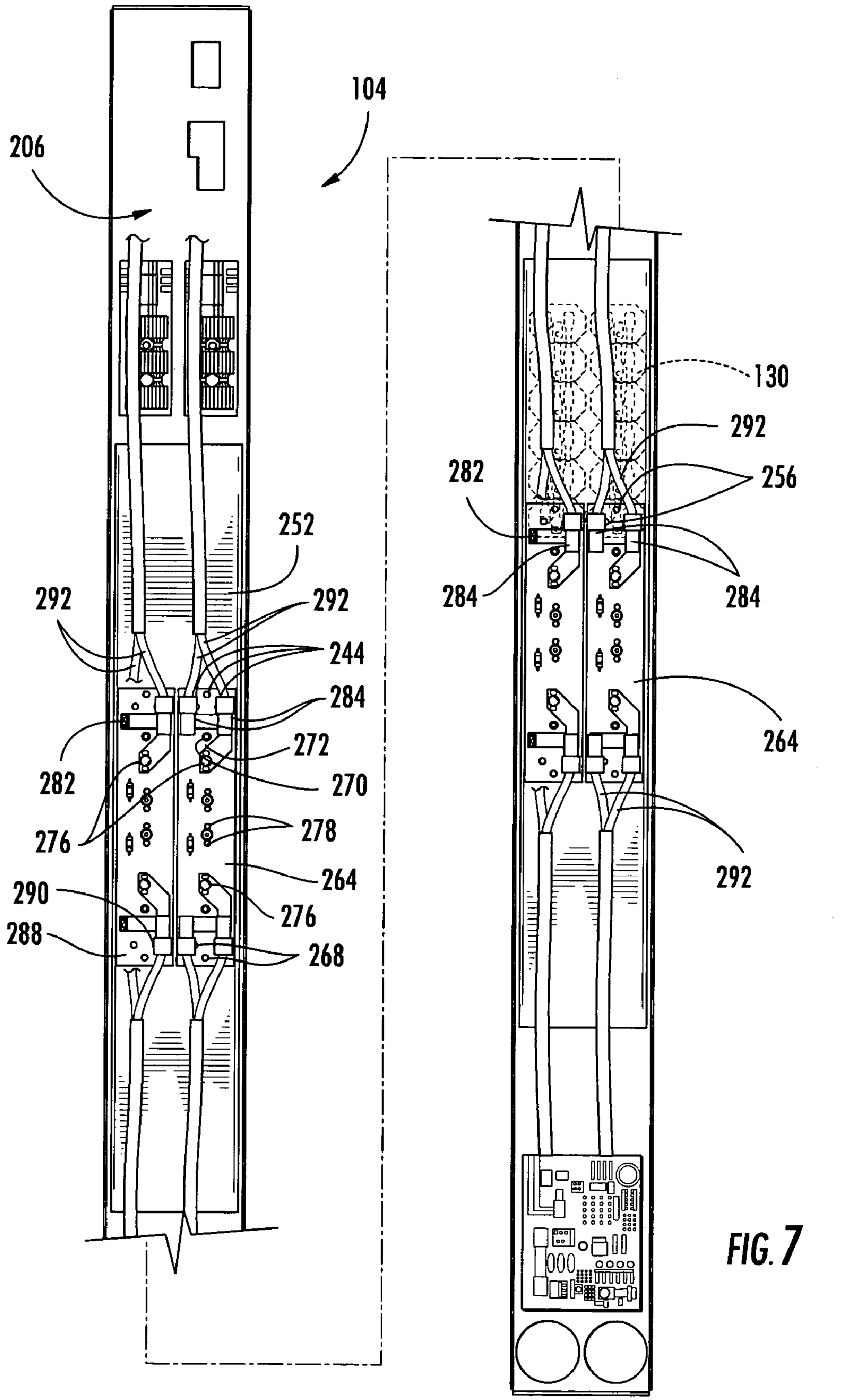
FIG. 7 is an elevational view of the inside of the top housing portion of the power distribution apparatus of FIG. 5 illustrating the placement of interconnection boards and nonconductive material on top of the components shown in FIG. 6.

FIGS. 5-7 show how the various components of the PDA 100 may be assembled within the housing 104. With reference first to FIG. 5, a view of the inside portion of the upper U-shaped portion 206 of the housing 104 is shown. A number of outlet apertures 124 can be seen extending longitudinally along the face 106 of the upper U-shaped portion 206.

An access opening 140 is disposed between each pair of outlet apertures 124. A window 150 is secured to each access opening 140 by fasteners 152 (FIG. 1). A rectangular mounting plate 314 is coupled to the top and bottom portion of each access opening 140. The mounting plate 314 has a cylindrical protrusion 318 (also see FIG. 2) extending into the interior of the housing 104. The cylindrical protrusion 318 is threaded for receiving the fasteners 152 from the outside of the housing 104 and for receiving a standoff mount 322 on the inside of the housing 104. The standoff mount 322 is matingly threaded for coupling to the cylindrical protrusion 318.

With reference now to FIG. 6, a plurality of linear outlet gangs 130 are shown mounted in the upper U-shaped portion 206, extending through the outlet apertures 124 (FIG. 5). Each outlet gang 130 provides a column of outlets 128. As shown, three generally linear power rails 238 are coupled to the back of each outlet gang 130. Depending on the application, more or less power rails 238 could be used. Each power rail 238 runs substantially the length of the back side of an outlet gang 130 and is connected to each outlet 128 in the outlet gang 130. The power rails 238 may be laterally spaced, being generally co-aligned. In certain embodiments, the power rails 238 are parallel.

An insulating barrier (not shown), which may be a protrusion, such as a flange or ridge extending from the back of an outlet gang 130, may be used to prevent electrical contact between adjacent power rails 238. In certain embodiments, the power rails 238 may be located internally within the outlet gang 130. Locating the power rails 238 within the outlet gangs 130 may reduce the chance for accidental contact between a power rail 238 and other components of the PDA 100 (including adjacent power rails 238), as well as reducing the possibility of damage to the power rails 238 or other components.

Each power rail 238 has a protrusion (not shown) that extends into a particular receptacle (not shown) of each power outlet 128 in an outlet gang 130. Each receptacle may receive a prong (not shown) from a power plug (not shown) of an electronic device (not shown). The power rails 238 therefore serve to electrically couple each power outlet 128 in an outlet gang 130. Each power rail 238 corresponds to a particular electrical component, such as a line, neutral, or ground connection of AC line power. The power rails 238 are preferably made from a conducting material, such as a conductive metal.

The use of the power rails 238 obviates individually wiring together multiple individual power outlets 128. Although the power rails 238 are shown as parallel, linear rails, other configurations could be used. For example, the power rails 238 could be curved in order to accommodate an arcuate pattern of power outlets 128.

Each power rail 238 has a connecting prong 244. Although the power rails 238 are shown as only having connecting prongs 244 at one end of each power rail 238, in at least certain embodiments, the connecting prongs 244 are located at both longitudinal ends of each power rail 238.

Each connecting prong 244 is used to place a power rail 238, and therefore a corresponding outlet gang 130, in electrical communication with other electrical components. The connecting prong 244 may be coupled to other electrical components by any suitable connecting means. In some embodiments, wires may be used as the connecting means. Of course, the present invention is not limited to power rails 238 having connecting prongs 244. Any suitable means may be used for placing the power rails 238 in electrical communication with other electrical components.

With reference now to FIG. 7, each outlet gang 130 (two of which are shown in see-through, environmental lines, in FIG. 7), is shown covered by a layer of nonconductive material 252 that extends substantially across the width of the upper U-shaped portion 206. More than one piece of the nonconductive material 252 may be used and the nonconductive material 252 may be shaped and sized as desired to insulate the electrical components of the PDA 100. The nonconductive material 252 may be made of any suitable material that substantially does not conduct electricity, such as plastics, rubber, and the like. In at least one embodiment, the nonconductive material 252 is Mylar.

The nonconductive material 252 can be used to prevent unintended electrical communication between adjacent electrical components, such as between the outlet gangs 130 and the fuse assemblies 144 (FIG. 1). For example, the nonconductive material 252 may be placed over the back of the outlet gangs 130 and between the fuse assemblies 144 (FIG. 1). The nonconductive material 252 may have holes 256 to allow the connecting prongs 244 to pass therethrough.

In a further embodiment, the PDA 100 includes a circuit breaking link interconnection board 264 that is connected to at least one electrical component. As shown in FIG. 6, the circuit breaking link interconnection board 264 is connected to two outlet gangs 130. However, the circuit breaking link interconnection board 264 can be connected to more or less electrical components of various types. In one embodiment, the circuit breaking link interconnection board 264 is an at least semi-rigid component capable of connecting to, and being in electrical communication with, at least one electrical component. In a presently preferred embodiment, the circuit breaking link interconnection board 164 is capable of placing a plurality of electrical components in electrical communication. In certain embodiments, the circuit breaking link interconnection board 264 is a printed circuit board. In at least one embodiment, the circuit breaking link interconnection board 264 is a four-layer printed circuit board.

The circuit breaking link connector 264 may have a number of holes (or pads) 268 extending therethrough. The holes 268 may be lined with a conducting material, such as a conductive metal. In at least one embodiment, a connecting prong 244 of a power rail 238 associated with an outlet gang 130 engages a hole 268. If desired, the connecting prong 244 may be further secured to the circuit breaking link interconnection board 264, such as by soldering. Nonconductive material 252 may be placed between the connecting prongs 244 and the circuit breaking link interconnection board 264. The connecting prongs 244 may extend through openings 256 in the nonconductive material 252.

The circuit breaking link interconnection board 264 is coupled to the upper U-shaped portion 206 of the housing 104. In one embodiment, the circuit breaking link interconnection board 264 is provided with a fastener hole 270. A fastener 272, such as a screw, is inserted through the fastener hole 270 and securely received by a mount 322 (FIG. 5) on the upper U-shaped portion 206. The fastener 272 may be in communication with a circuit of the PDA 100 (FIG. 1) and serve as a ground connection.

The fuse clamp arms 148 (FIG. 1) are mounted to the outwardly facing side of the circuit breaking link interconnection board 264. The fuse clamps arms 148 are secured by a rivet 276 and by soldered connections 278 to the circuit breaking link interconnection board 264. The circuit breaking link interconnection board 264 has slip-on connectors 282 to which power inputs 284 are attached. Power may thus pass from the power inputs 284, through the slip-on connectors 282, and into the circuit breaking link interconnection board 264 where it can be transferred through the clamp arms 148 and through the holes 268 to the power rails 238 of the outlet gangs 130.

The circuit breaking link interconnection board 264 may be used to transmit electrical signals to, or electrically couple, electrical parts attached to the circuit breaking link interconnection board 264. In at least one embodiment, the circuit breaking link interconnection board 264 is used to transmit components of AC line power to electrical parts attached to opposite ends of the circuit breaking link interconnection board 264. In the case of outlet gangs 130 having connecting prongs 244 at only one end, similar connections between outlet gangs 130 and the circuit breaking link interconnection board 264 may occur at opposite sides of opposite ends of the circuit breaking link interconnection board 264, such as between position 286 and position 288. However, if the outlet gangs 130 are provided with connectors 244 at each end, similar connections between the outlet gangs 130 and the circuit breaking link interconnection board 264 may occur at the same side at each opposite end of the circuit breaking link interconnection board 264, such as between position 286 and position 290. The fastener 272 may serve as a ground connection for the circuit breaking link interconnection board 264 and electrical components attached thereto, thus eliminating the need to provide a separate ground connection.

As shown in FIG. 7, a plurality of wires 292 connect the various components of the PDA 100, such as the outlet gangs 130 and the circuit breaking link interconnection board 264. The wires 292 may be insulated wires, in order to help prevent unintended electrical contact between the wires 292 and the other components of the PDA 100. In addition, the wires 292 may be placed on the opposite side of the nonconductive material 252 from the outlet gangs 130 in order to help prevent such unintended contact. The wires 292 may be secured together by fasteners (not shown), such as locking plastic bands.

In embodiments where the circuit breaking link interconnection board 264 is a printed circuit board having multiple layers, each layer may correspond to a single electrical component. For example, when the circuit breaking link interconnection board 264 is used for power transmission, such as AC line power transmission, one layer may correspond to a line, or "hot", electrical connection, one layer may correspond to a neutral connection, and one layer may be connected to a ground. The use of an entire layer of the circuit breaking link interconnection board 264 for each connection may allow for larger amounts of electricity to flow through the printed circuit board 264.

Figure 8:
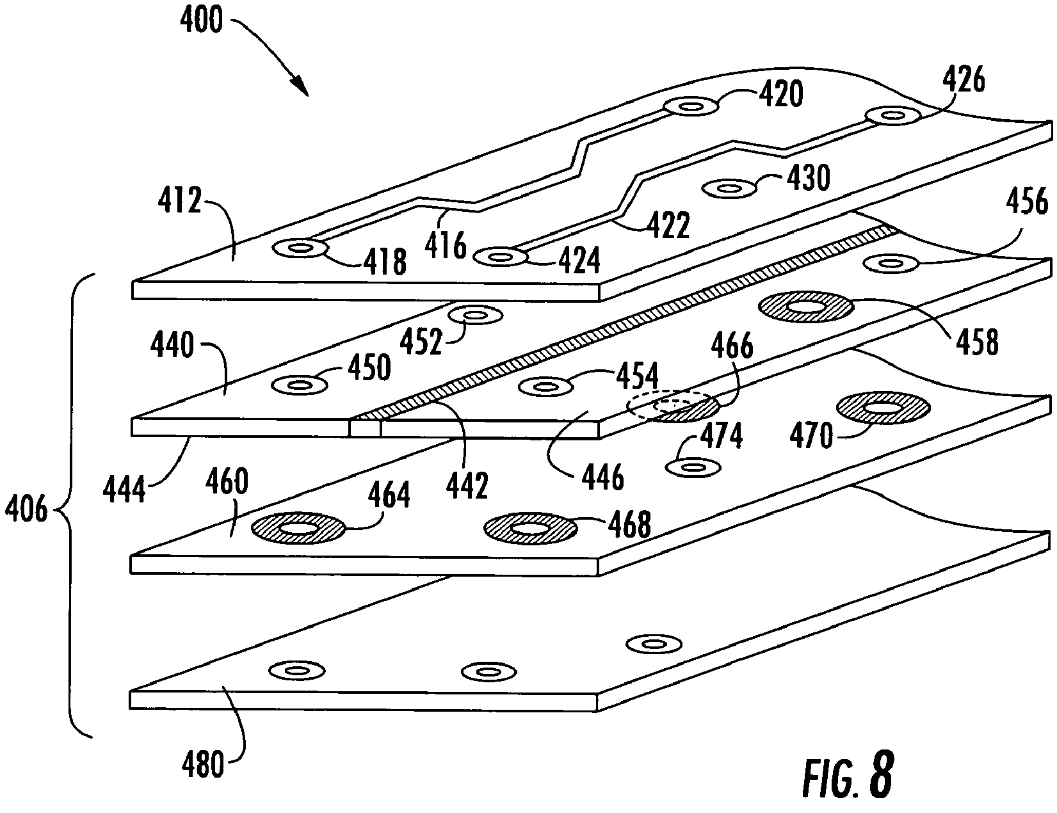
FIG. 8 is an illustration of an embodiment of a circuit breaking link interconnection board formed from a printed circuit board having a plurality of layers and having a layer formed into two sublayers, the two sublayers being insulated from each other.

FIG. 8 depicts an alternate embodiment of a circuit board 400 for use in embodiments of the present invention, including as part of a circuit breaking link interconnection board 264. The circuit board 400 comprises a plurality of layers 406. Each layer 406 may be used to transmit one or more electrical components, such as components of AC line power.

Layer 412 may be a signal layer having a connection 416 between a first connection point 418 and a second connection point 420. The layer 412 may also have a connection 422 between a third connection point 424 and a fourth connection point 426. Connections 416 and 422 serve to transmit electrical signals to, or electrically couple, devices or components attached to connection points 418, 420 and 424, 426, respectively. Additional connection points, such as connection point 430, may also be provided. Although FIG. 8 depicts connections between connection points on the same side of the circuit board 400, connections can be made between connection points at any location of the circuit board 400. For example, a connection could be made between the connection point 418 and the connection point 426.

Layer 440 is shown as a split plane. The layer 440 may be substantially a solid plane of conducting material, such as copper. However, the layer 440 has an insulating barrier 442 which divides the layer 440 into a first side 444 and a second side 446. The insulating barrier 442 may be an area of the layer 440 where the conducting material has been removed, an insulating material or coating placed on or in the layer 440, or any other suitable insulating means. The layer 440 also has connection points 450, 452 and 454, 456 which may be in communication with connection points 418, 420 and 424, 426, respectively.

Each side 444, 446 of the circuit board 400 may carry an electronic component, such as a component of AC line power, which may be the same or different. In at least one embodiment, the first side 444 carries a line component of AC line power and the second side 446 carries a neutral component of AC line power. In this way, power can be conducted through the layer 440 to devices attached to the connection points 418-426. A connector 458 is shown having at least a portion of its conducting material removed, or otherwise being insulated from the connection point 430.

As shown in FIG. 8, layer 460 may be a unified conductive layer, such as a copper layer. However, connectors 464, 466, 468, 470, located on layer 460, have had at least a portion of their conducting material removed, or otherwise are insulated from connection points 418-426 and 450-456. Connection point 474 is in communication with the connection point 430. Layer 480 may be another signal layer.

The use of split plane layers may allow for a greater variety of electrical signals and power components to be distributed across the circuit board 400, while allowing circuit boards having a relatively small number of layers to be used. In addition, circuit boards having split plane layers may allow a greater number of connections to be made, a greater variety of connections to be made, and/or a greater number of devices to be connected by, or to, a circuit board 400.

Embodiments of the circuit board 400 are not limited to the circuit board 400 shown in FIG. 8. For example, greater or fewer layers could be used, the number and position of signal, solid, and split layers may be varied. In addition, transmission layers may be broken up into more than two sublayers. However, each sublayer is preferably suitably large enough to transmit the desired electrical component. In the case of power transmission, particularly AC power transmission, even more particularly AC-line power, each layer or sublayer is preferably suitably large enough to effectively transmit a component of AC line power.

Figure 9:
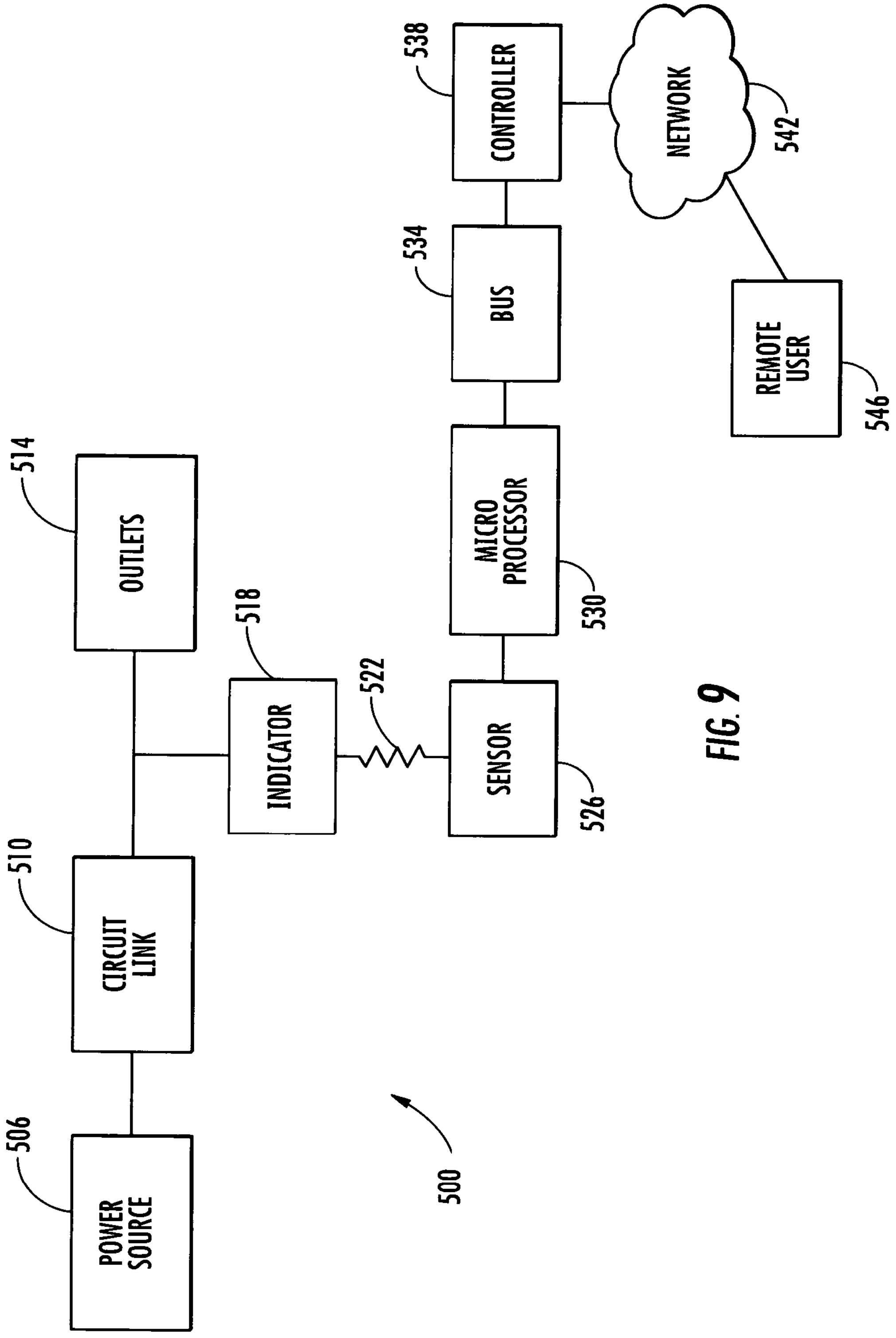
FIG. 9 is a schematic diagram for a circuit breaking link status detection and reporting circuit for single-phase power according to an embodiment of the present invention.

In certain embodiments, the circuit breaking link interconnection board 264 includes a circuit breaking link status detection and reporting (CLSDR) circuit. FIG. 9 illustrates a schematic diagram of a CLSDR circuit that may be used with a PDA 100 using single phase power. The single phase of power is shown as power source 506. Power from power source 506 is transmitted to a circuit breaking link 510, which may be any suitable circuit breaking link, such as a fuse or circuit breaker.

The circuit breaking link 510 is connected in parallel to outlets 514 and an indicator 518. The indicator is an LED or other suitable indicator. The indicator 518 is connected, optionally through a resistor 522, to a sensor 526. In embodiments where the PDA 100 (FIG. 1) delivers 208-240 volt power, the resistor may be a 47 kilo ohm, 1 watt resistor. In embodiments where the PDA 100 (FIG. 1) delivers 110-120 volt power, the resistor may be a 22 kilo ohm, 1 watt resistor. Of course, other resistor values may be used or the resistor may be omitted in certain implementations.

The sensor 526 detects voltage or current in the CLSDR circuit 500. In a preferred embodiment, the sensor 526 is a voltage sensor. In a particularly preferred embodiment, the sensor 526 is an optoisolator.

The sensor 526 is in communication with a microprocessor 530. The microprocessor detects the signals from the senor 526 and determines whether the CLSDR circuit 500 is open or closed. The state of the CLSDR circuit 500 is communicated to a controller 538 through a bus 534. The bus 534 may be any suitable communications bus, such as a 485, I2C, or CAN bus.

The controller 538 is preferably located in the PDA 100 and may monitor and control other functions of the PDA 100. The controller 538 is in communication with a remote user 546, such as through a network 542. The network 542 may be the internet, an intranet, a local area network (LAN), a wide area network (WAN), a virtual private network (VPN), or other suitable network.

Figure 10:
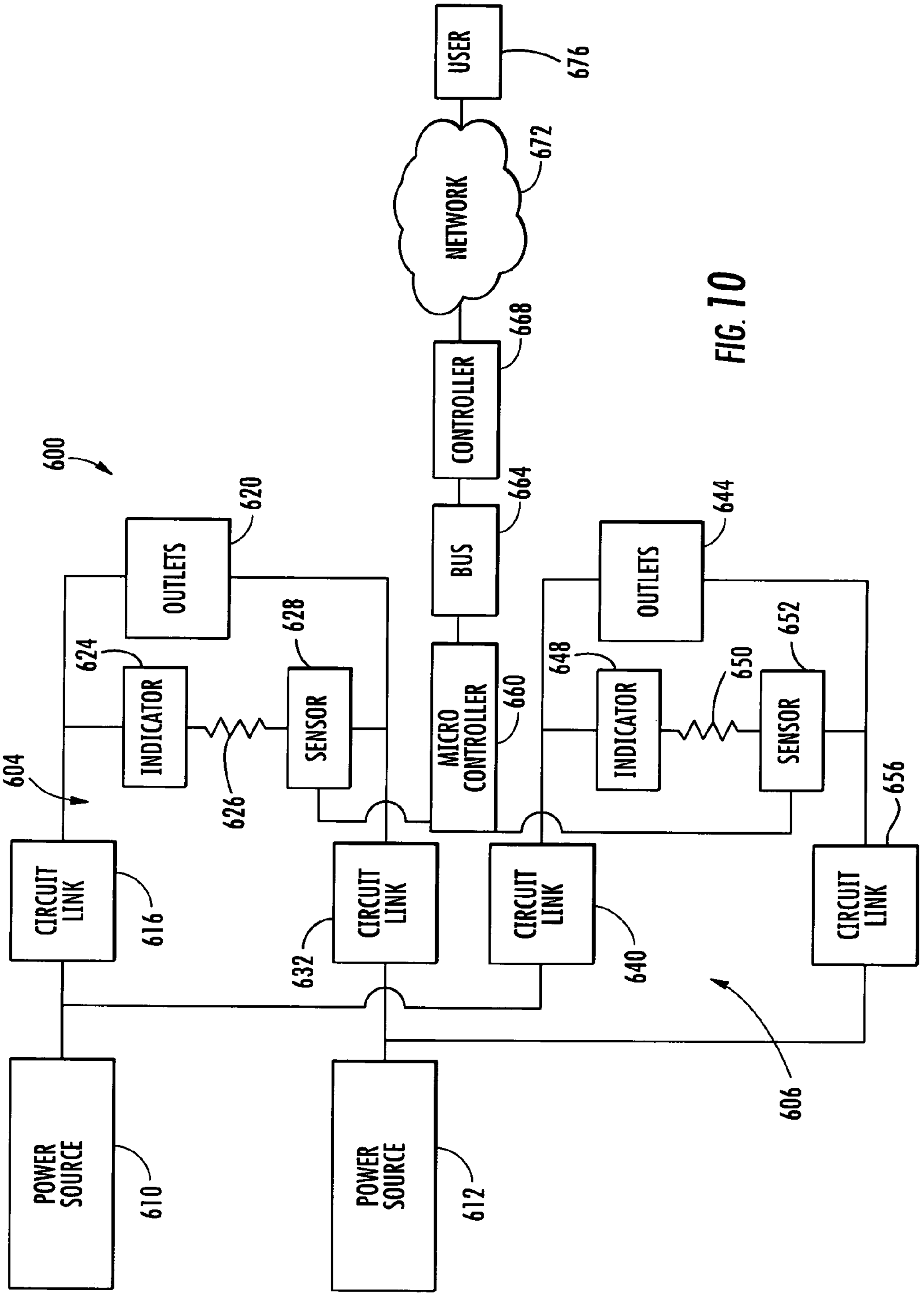
FIG. 10 is a schematic diagram for a circuit breaking link status detection and reporting circuit for two-phase power according to an embodiment of the present invention.

FIG. 10 illustrates a system 600 having multiple CLSDR circuits 604, 606. Each CLSDR circuit 604, 606 includes a first power source 610 and a second power source 612. In the upper circuit 604, the first power source 610 is connected to a circuit breaking link 616. The circuit breaking link 616 is connected in parallel to outlets 620 and an indicator 624. The indicator 624 is in communication with a sensor 628, optionally through a resistor 626, which may be a resistor such as the resistor 522. The second power source 612 is connected to a circuit breaking link 632. The circuit breaking link 632 is connected in parallel to the outlets 620 and to the sensor 628 and the indicator 624.

Turning now to the bottom CLSDR circuit 606, the first power source 610 is connected to a circuit breaking link 640. The circuit breaking link 640 is connected in parallel to outlets 644 and an indicator 648. The indicator 648 is connected to a sensor 652, optionally through a resistor 650. The second power source 612 is connected to a circuit breaking link 656. The circuit breaking link 656 is connected in parallel to outlets 644 and to the sensor 652 and the indicator 648.

The sensors 628 and 652 are connected to a microcontroller 660. The microcontroller 660 is in communication with a controller 668 through a communications bus 664. The controller 668 is in communication with a remote user 676, such as through a network 672.

The system 600 may be similar in operation and construction to the circuit 500 of FIG. 9. When any of the circuit breaking links 616, 632, 640, 656 opens its respective circuit 604, 606, the event will be detected by sensor 628 or 652 and communicated to the remote user 676.

As illustrated, the system 600 senses which circuit 604, 606 has opened and helps identify which circuit breaking link needs to be replaced or reset. If desired, additional sensors may be included in a respective circuit 604, 606 to specifically identify which circuit breaking link has opened and needs to be replaced or reset.

It can thus be seen that certain embodiments of the present invention provide a circuit that senses the status of a circuit breaking link and reports the status of the circuit breaking link to a remote user. When incorporated into a device, such as a power distribution unit, embodiments of the present invention allow a remote user to be notified when a circuit breaking link has opened a circuit and outlets associated with the circuit are thus no longer supplying power to their attached electrical devices. Particularly when a number of independent power branches are on a device, embodiments of the present invention may aid in identifying which circuit breaking link needs to be replaced or reset, and this may allow the circuit breaking link to be more quickly located and reset or replaced. This aspect may be particularly useful when large numbers of devices and/or circuit breaking links are present.

Certain embodiments provide a visual cue on a device containing one or more circuit breaking link that one or more the device's circuit breaking links needs to be reset or replaced. These embodiments may allow an operator to more easily locate such circuit breaking links, among other circuit breaking links on the device and other nearby circuit breaking link containing devices, which may reduce equipment downtime and/or service costs.

At least certain embodiments provide for devices with branched circuit protection, where one or more outlets are protected by a circuit breaking link, and each device typically has a plurality of branches. Reducing the number of outlets protected by each circuit breaking link may limit the scope of any disruption caused by a failed circuit breaking link.

Although generally described as including multiple outlets, a branch may contain a single outlet. The number of outlets protected by a circuit breaking link can be varied as desired, including based on the operating conditions and/or the space available in devices that will contain the circuit breaking links.

It is to be understood that the above discussion provides a detailed description of preferred embodiments. The embodiments are illustrative and not intended to limit the scope of the present invention. The above descriptions of the preferred embodiments will enable those skilled in the art to make many departures from the particular examples described above to provide apparatus constructed in accordance with the present invention. The scope of the present invention is rather to be determined by the scope of the claims as issued.

What is claimed is:

1. A power distribution unit of the type useable to distribute power from a power input to a plurality of electronic apparatus, the power distribution unit comprising:

(A) a power distribution unit housing having at least one power input passage formed in the power distribution unit housing;

(B) a power input penetrating the power distribution unit housing through the at least one power input passage;

(C) a plurality of outlets accessible through the power distribution unit housing which may supply power to electronic devices attachable to the plurality of outlets;

(D) a first circuit breaking link disposed in the housing and in communication with at least a first outlet of the plurality of outlets and the power input;

(E) a circuit breaking link status determination and reporting system comprising:

(a) a first sensor in communication with a first circuit comprising the first outlet, the first sensor configured to detect whether power is being supplied to the first circuit;

(b) a first processor in communication with the first sensor, the first processor configured to receive information from the first sensor and determine whether power is being supplied to the first circuit;

(c) a communications bus coupled to the first processor and configured to transmit signals from the first processor;

(d) a second processor in communication with the communications bus and connectable to an external network, the second processor configured to send information to and receive information from the first processor and the external network;

(F) a second circuit breaking link disposed in the housing and in communication with at least a second outlet of the plurality of outlets and the power input; and (G) a second circuit comprising a second sensor disposed in the housing and in communication with the second outlet and the second circuit breaking link, wherein the first outlet is part of a first branch of outlets, the first circuit breaking link, the first circuit, and the first sensor in communication with the first branch of outlets and the second outlet is part of a second branch of outlets, the second circuit breaking link, the second circuit, and the second sensor in communication with the second branch of outlets.

2. The power distribution unit of claim 1, wherein the first circuit breaking link is in communication with a first phase of the power input and the second circuit breaking link is in communication with a second phase of the power input.

3. The power distribution unit of claim 1, wherein the first circuit breaking link is in communication with a first phase of the power input, further comprising a second sensor in communication with a second circuit comprising the second outlet and a second phase of the power input, the second sensor in communication with the first processor, the first processor further configured to receive information from the second sensor and determine whether power is being supplied to the second circuit.

4. The power distribution unit of claim 3, further comprising:

(A) a third circuit breaking link coupled to the second phase of the power input the first sensor, and the first outlet; and (B) a fourth circuit breaking link coupled to the first phase of the power input, the second sensor, and the second outlet.

5. The power distribution unit of claim 1, wherein the circuit breaking link comprises a fuse.

6. The power distribution unit of claim 1, wherein the circuit breaking link comprises a circuit breaker.

7. The power distribution unit of claim 1, wherein the circuit breaking link is coupled to a circuit breaking link interconnection board.

8. The power distribution unit of claim 7, wherein the circuit breaking link interconnection board comprises a printed circuit board.

9. The power distribution unit of claim 1, wherein the power distribution unit housing is configured to be mounted vertically in an electronic equipment rack.

10. The power distribution unit of claim 1, wherein the circuit breaking link status determination and reporting system is disposed in the power distribution unit housing, the power distribution unit housing being configured to be mounted vertically in an electronic equipment rack.

11. The power distribution unit of claim 1, further comprising:

an electronic equipment rack configured to hold a plurality of electronic devices, wherein the power distribution unit housing is mounted vertically in the electronic equipment rack.

12. The power distribution unit of claim 1, the first circuit further comprising a fuse status indicator mounted in the power distribution unit housing and in communication with the first circuit breaking link, whereby the fuse status indicator indicates the status of the first circuit breaking link.

13. The power distribution unit of claim 12, the fuse status indicator comprising an illuminable indicator.

14. The power distribution unit of claim 1, wherein the first sensor comprises a voltage sensor.

15. The power distribution unit of claim 1, wherein the first sensor comprises a current sensor.

16. The power distribution unit of claim 1, wherein the first sensor comprises an optoisolator.

17. The power distribution unit of claim 1, wherein the communications bus is selected from the group consisting of I2C, CAN, and RS-485.

18. The power distribution unit of claim 1, further comprising a second circuit breaking link disposed in the housing and in communication with the at least a first outlet of the plurality of outlets, the power input and the first sensor.

19. The power distribution unit of claim 18, wherein the first circuit breaking link is in communication with a first phase of the power input and the second circuit breaking link is in communication with a second phase of the power input.

20. The power distribution unit of claim 18, wherein the first outlet is part of a first branch of outlets, the first circuit breaking link, the first circuit, and the first sensor in communication with the first branch of outlets.

21. The power distribution unit of claim 1, wherein the power input comprises an AC line power input.

* * * * *